Oct. 31, 1933.  C. H. THORDARSON  1,932,942
METHOD OF AND MACHINE FOR MAKING TUBES
Filed Sept. 4, 1930  15 Sheets-Sheet 6
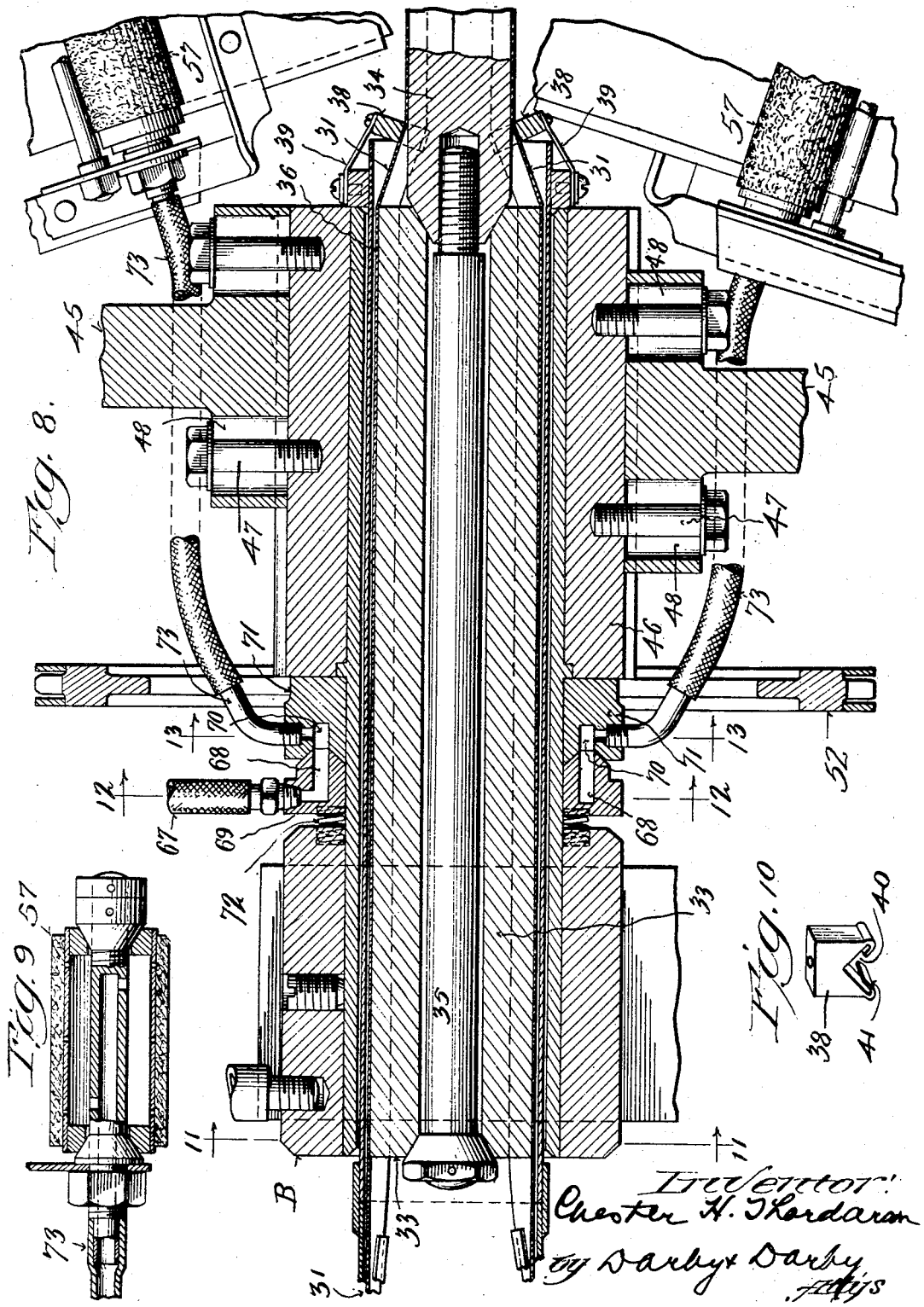
Inventor:
Chester H. Thordarson
by Darby & Darby
Attys Oct. 31, 1933.   C. H. THORDARSON   1,932,942
METHOD OF AND MACHINE FOR MAKING TUBES
Filed Sept. 4, 1930   15 Sheets-Sheet 7
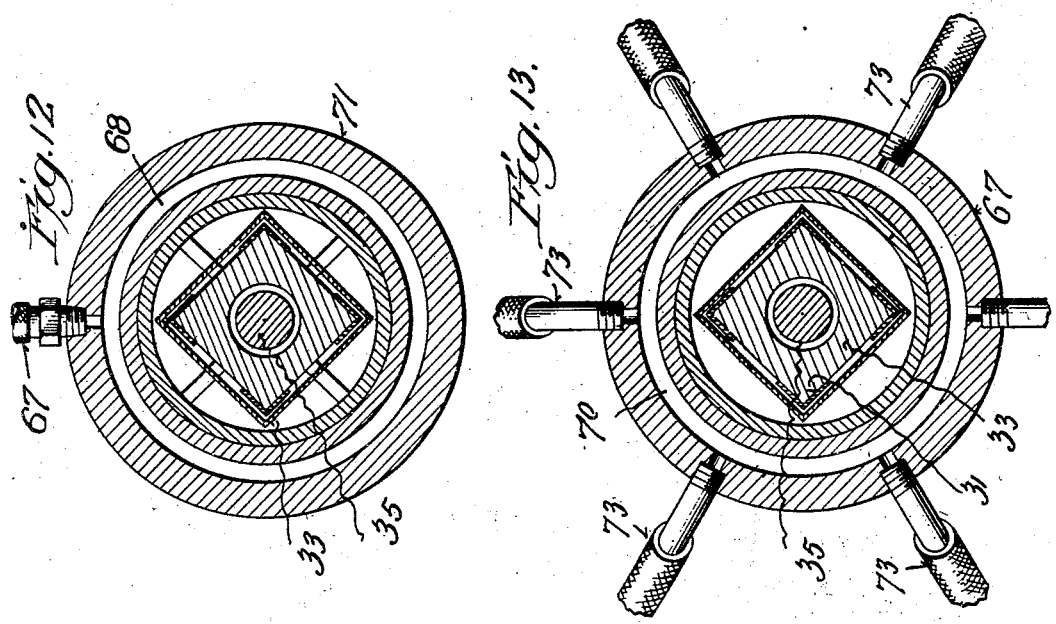
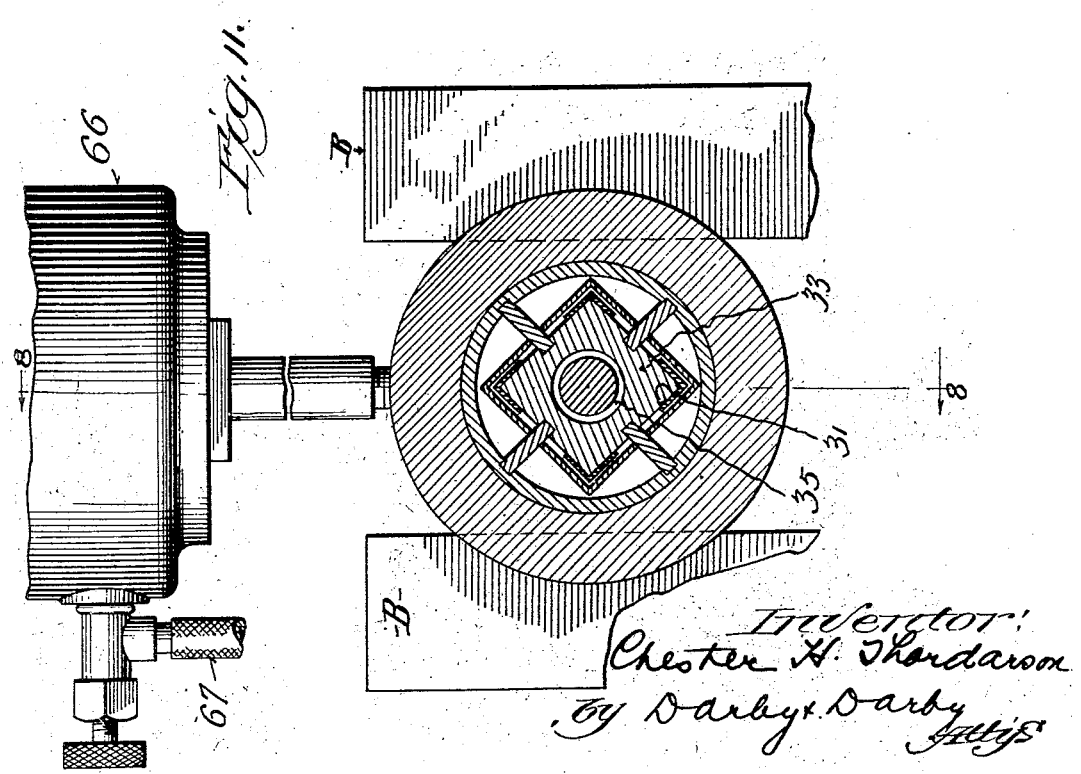
Inventor:
Chester H. Thordarson
By Darby & Darby
Attys

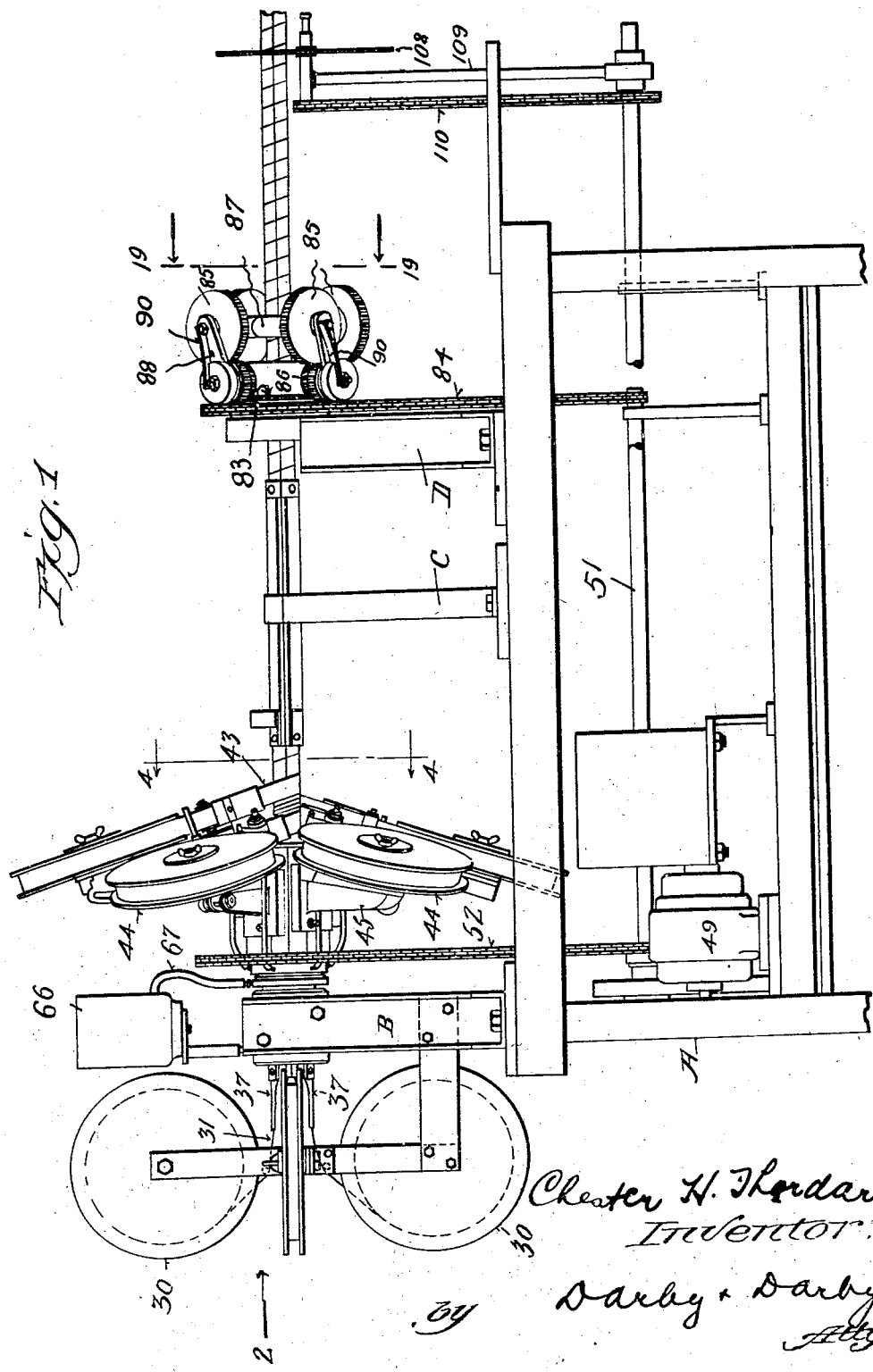

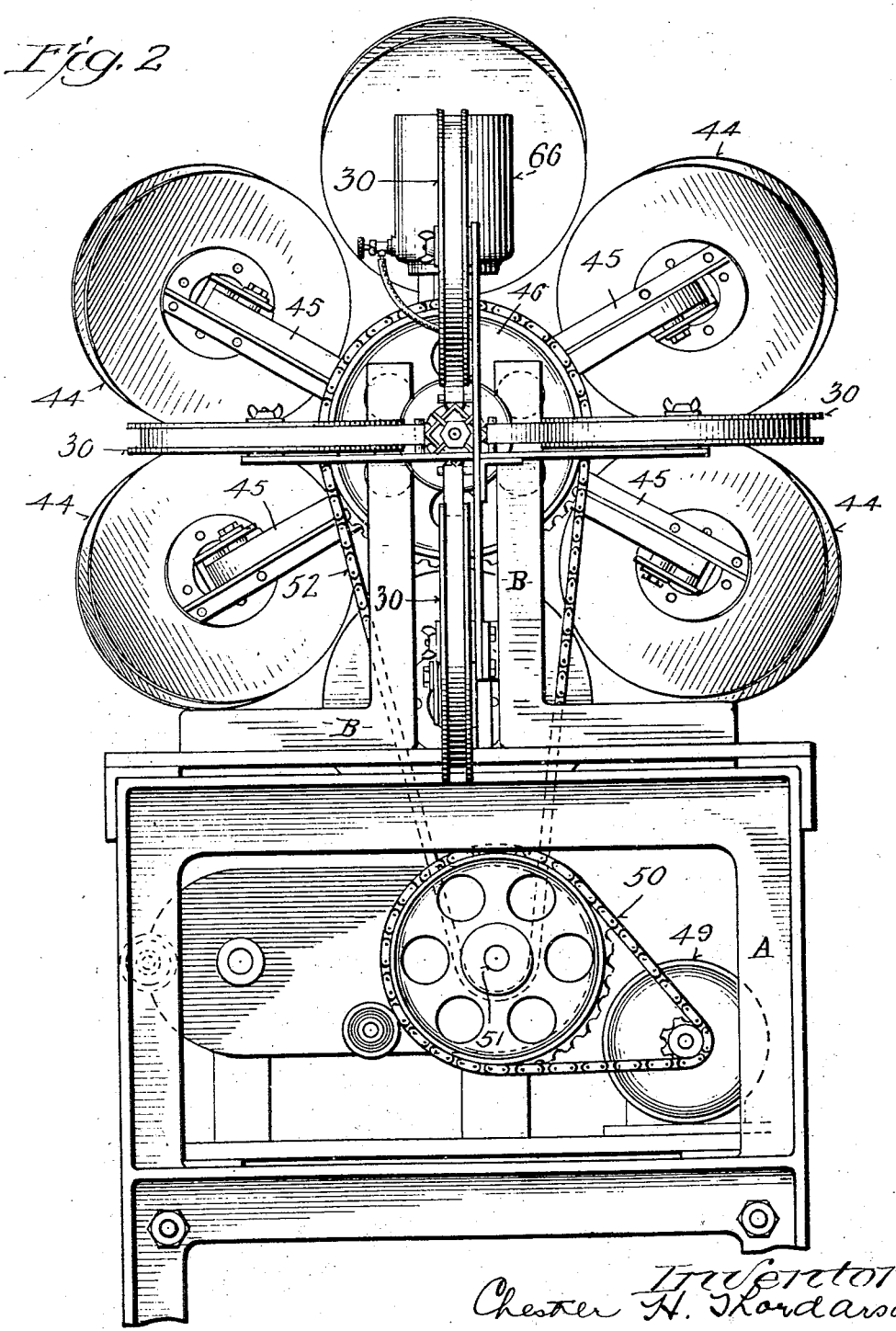

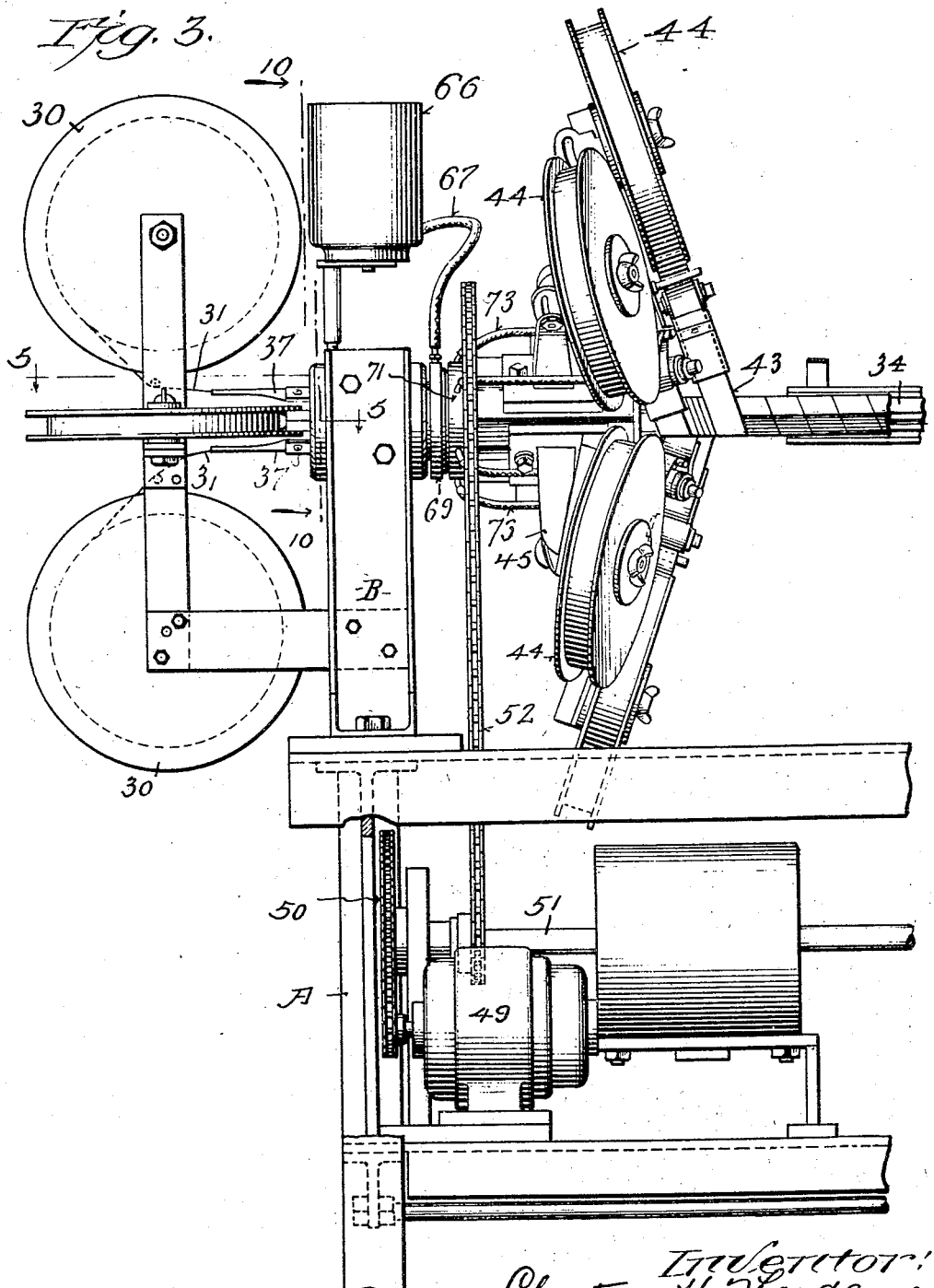

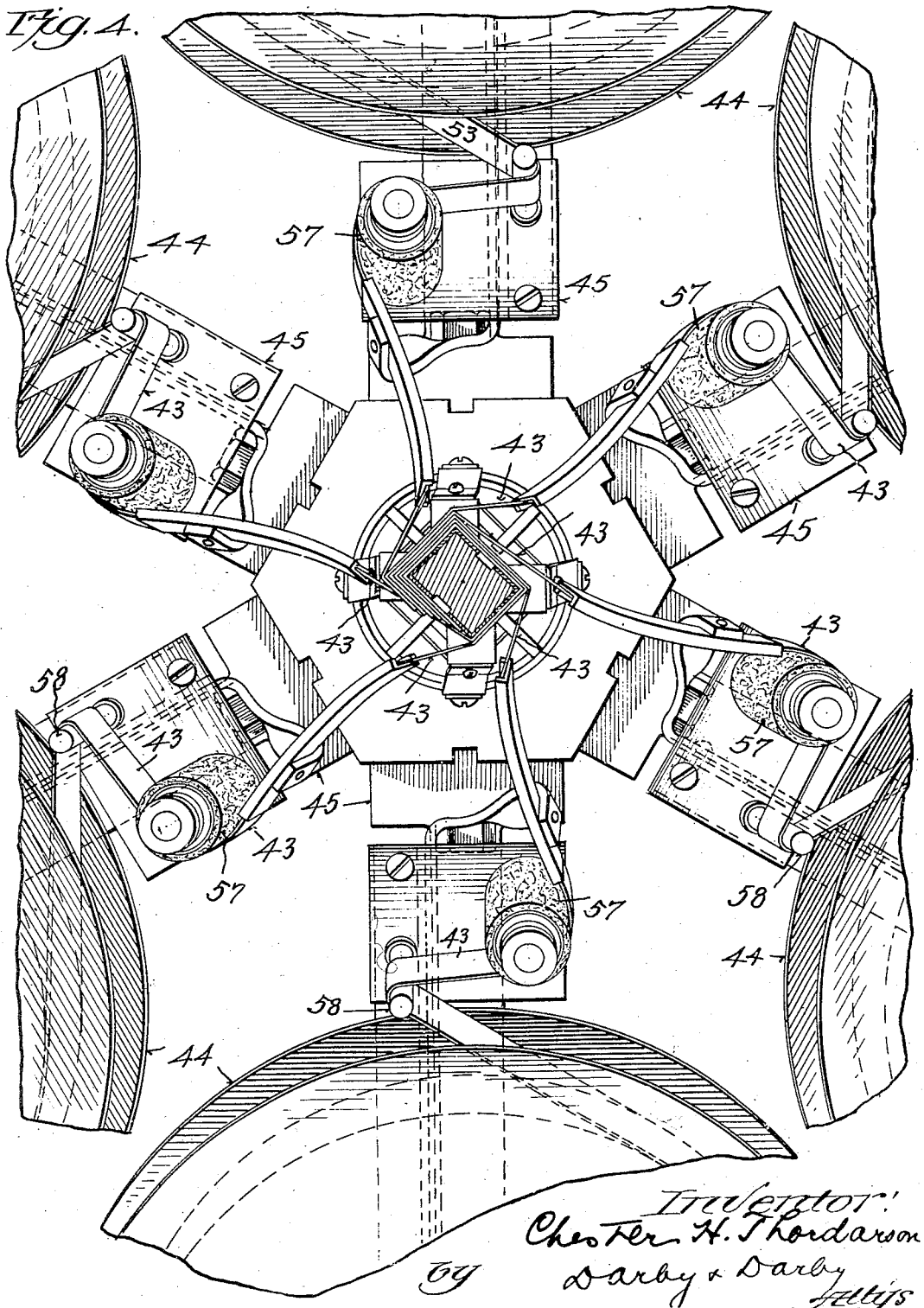

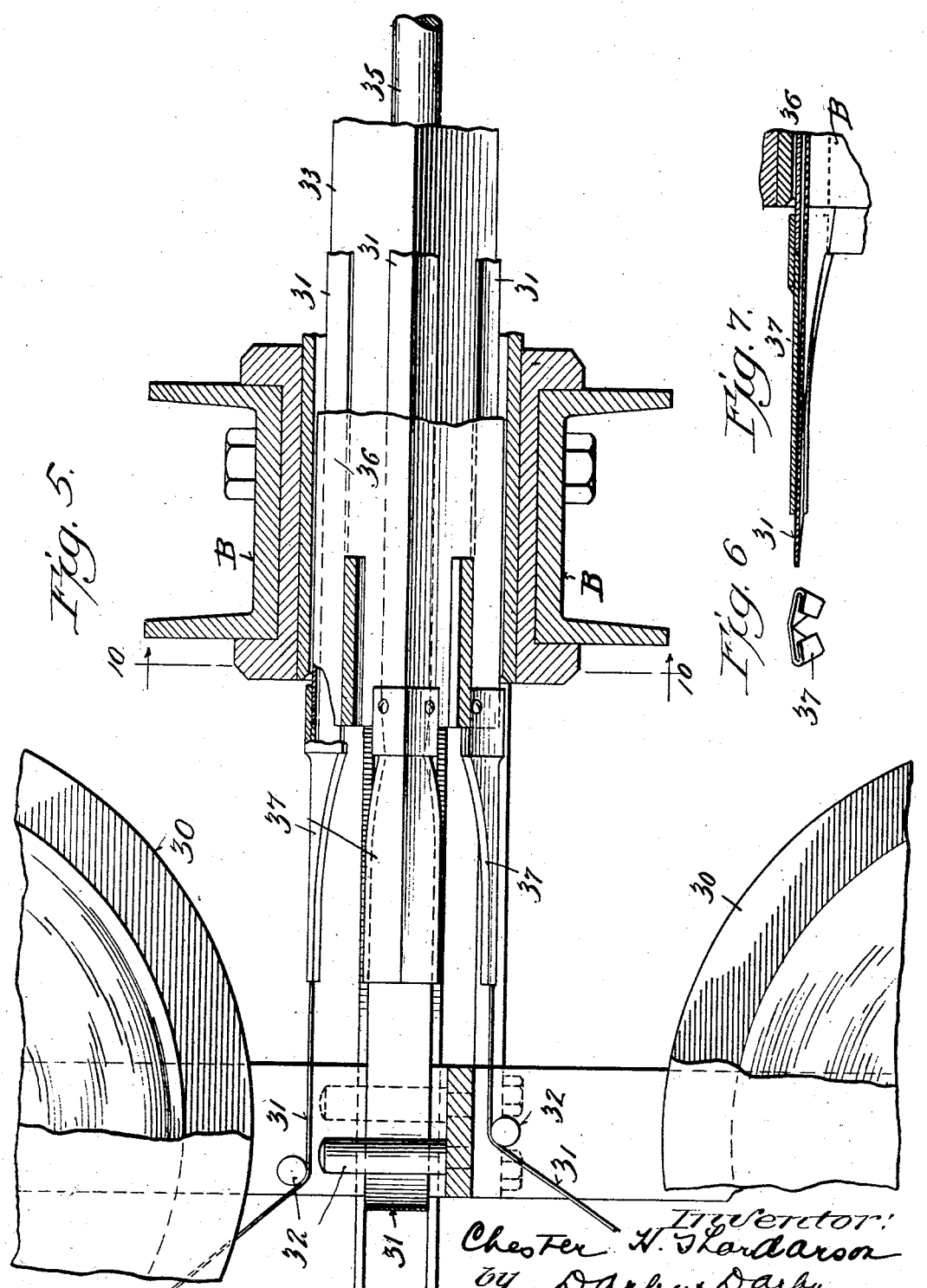

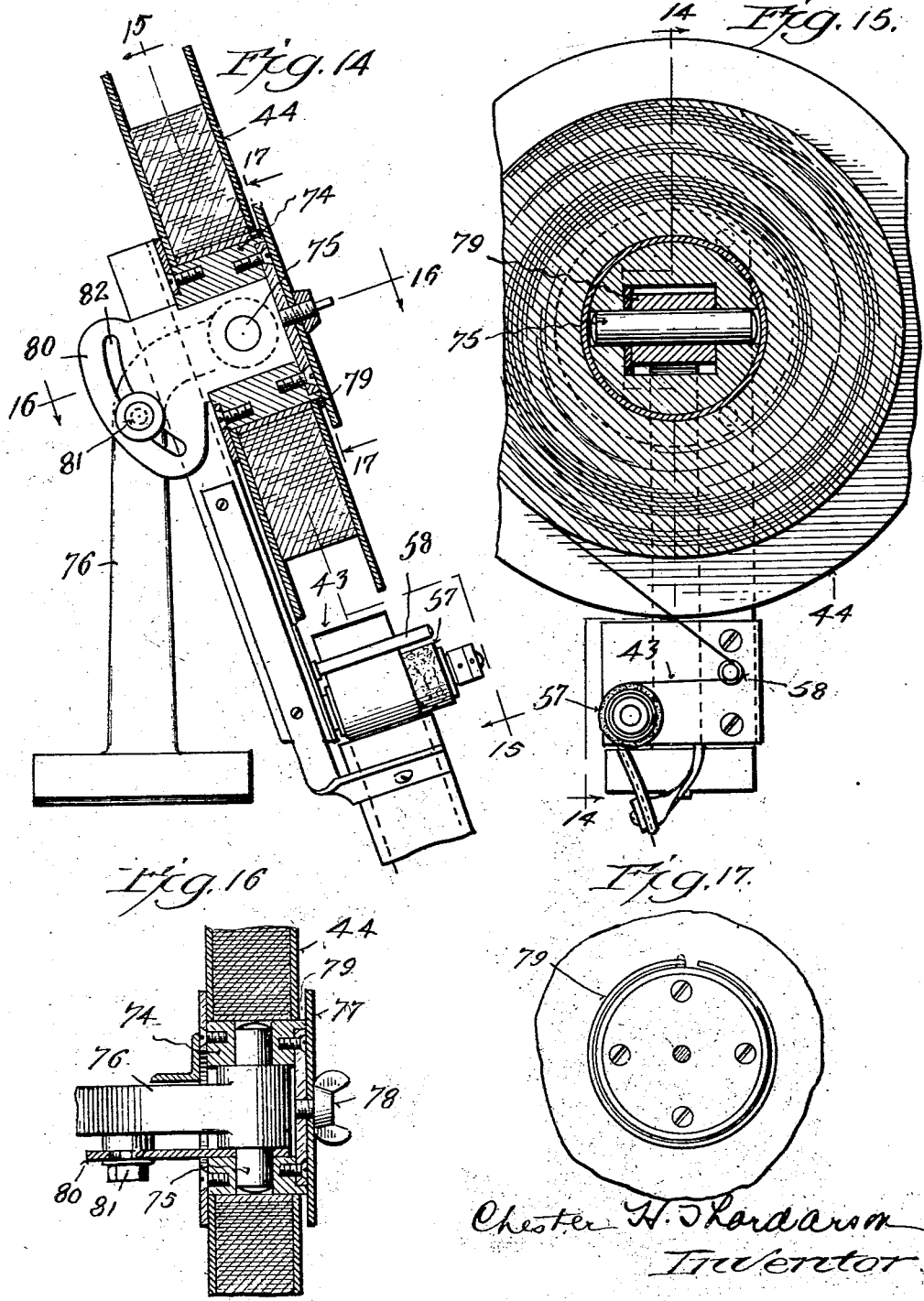

Oct. 31, 1933.   C. H. THORDARSON   1,932,942
METHOD OF AND MACHINE FOR MAKING TUBES
Filed Sept. 4, 1930   15 Sheets-Sheet 9
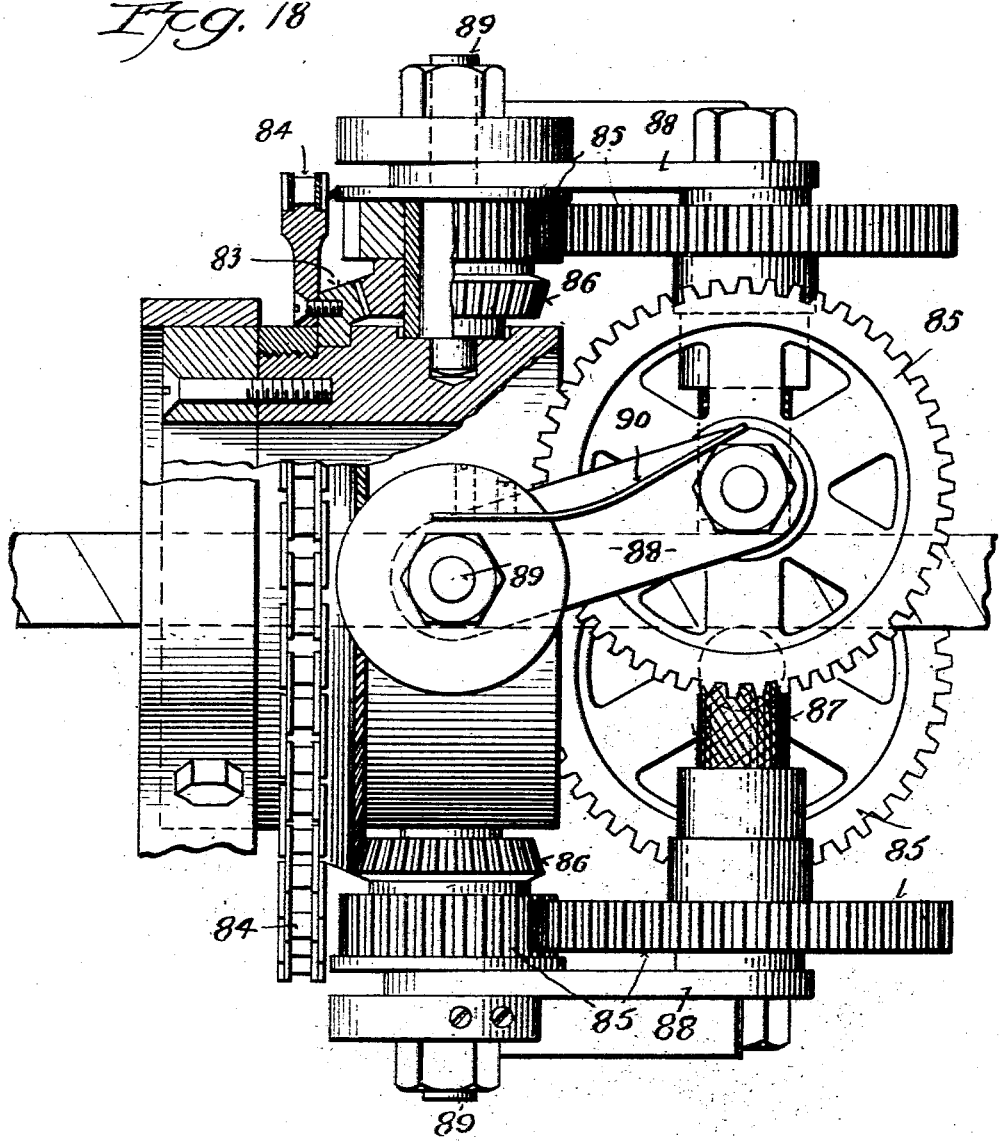

Oct. 31, 1933.  C. H. THORDARSON  1,932,942
METHOD OF AND MACHINE FOR MAKING TUBES
Filed Sept. 4, 1930  15 Sheets-Sheet 10

Inventor
Chester H. Thordarson
by Darby & Darby
Attys

Oct. 31, 1933.  C. H. THORDARSON  1,932,942
METHOD OF AND MACHINE FOR MAKING TUBES
Filed Sept. 4, 1930  15 Sheets-Sheet 11

Oct. 31, 1933.     C. H. THORDARSON     1,932,942
METHOD OF AND MACHINE FOR MAKING TUBES
Filed Sept. 4, 1930     15 Sheets-Sheet 13
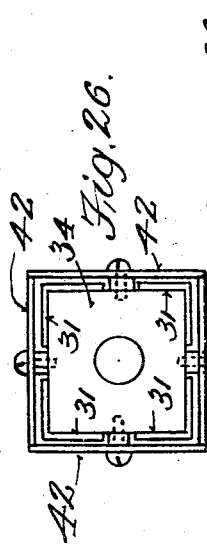

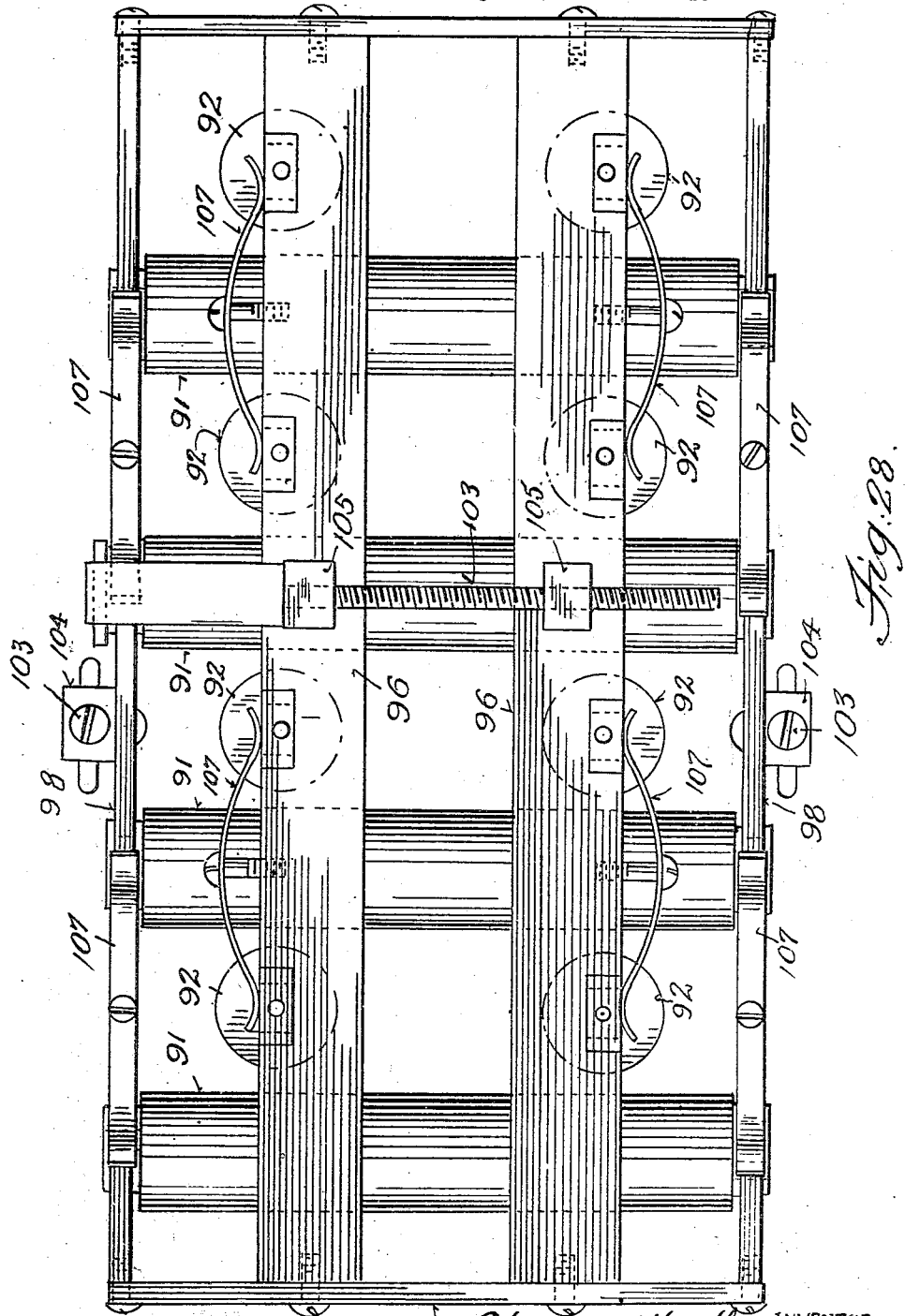

Oct. 31, 1933.   C. H. THORDARSON   1,932,942
METHOD OF AND MACHINE FOR MAKING TUBES
Filed Sept. 4, 1930   15 Sheets-Sheet 15
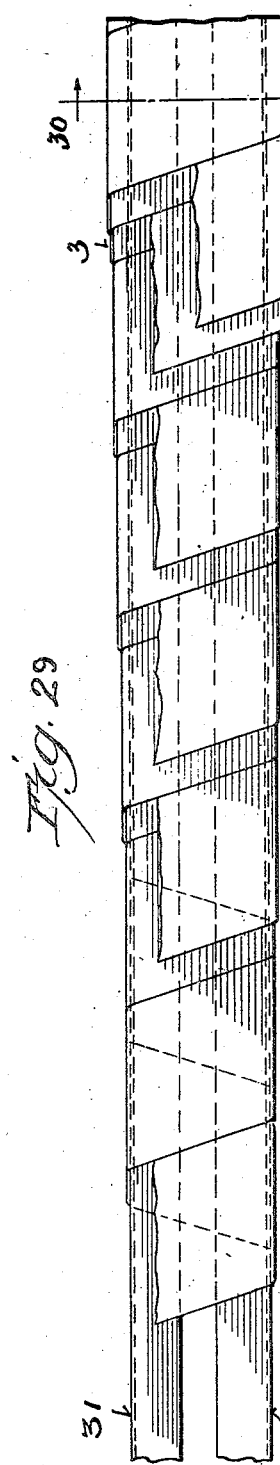
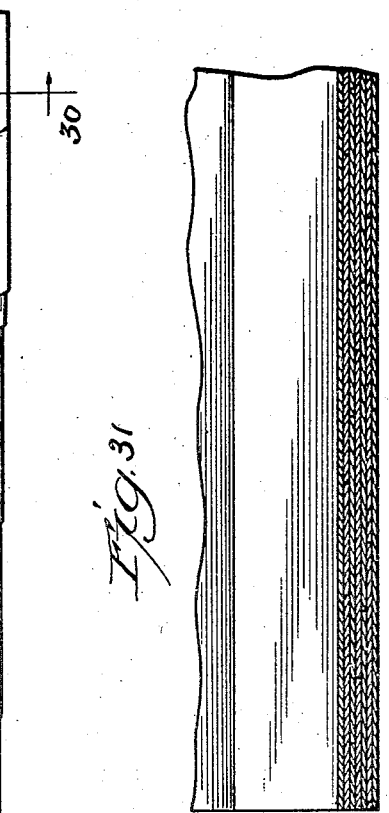
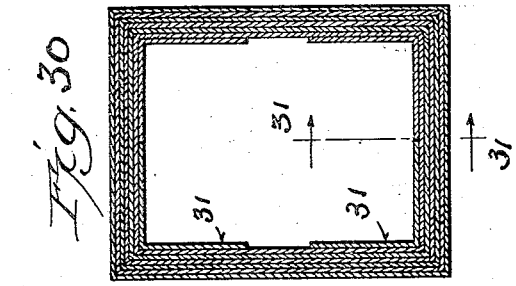
Chester H. Thordarson
Inventor:
By Darby & Darby
Attys Patented Oct. 31, 1933

1,932,942

UNITED STATES PATENT OFFICE 1,932,942

METHOD OF AND MACHINE FOR MAKING TUBES

Chester H. Thordarson, Chicago, Ill.

Application September 4, 1930. Serial No. 479,694

32 Claims. (Cl. 93—80)

This invention relates to a method of and machine for making tubes.

The object of the invention is to provide a method of and a machine for making tubes which are simple and efficient.

A further object of the invention is to provide an improved method of and machine for making polysided tubes.

A further object is to provide a method of and machine for applying to and helically wrapping upon each other strips of suitable material to form a tube structure for use for any purpose for which the tubular structure is adapted.

A further object is to provide a method of and means for forming a built-up or composite tubular structure, wherein strips of suitable material are helically wound or wrapped upon each other in opposite directions.

A further object is to provide an apparatus for and method of producing tubular structures according to which a plurality of strips are helically wrapped or lapped upon each other in a continuous progression.

Other objects and purposes of the invention will appear more fully hereinafter.

The invention consists substantially in the construction, combination, location and relative arrangement of parts, and steps or modes or operation, all as will be more fully hereinafter set forth, as shown in the accompanying drawings, and finally pointed out in the appended claims.

Referring to the accompanying drawings—

Figure 1 is a view in side elevation of a mechanism embodying the principles and adapted for carrying out, in one form of apparatus, a mode of operation of my invention;

Fig. 2 is a view in end elevation of the structure shown in Fig. 1;

Fig. 3 is a view in side elevation of the left-hand end of the mechanism shown in Fig. 1, parts broken out and parts broken off;

Fig. 4 is a view in vertical transverse section on the line 4—4 of Fig. 1, looking in the direction of the arrows;

Fig. 5 is an enlarged broken detail view in section on the line 5—5 of Fig. 3, looking in the direction of the arrows, and showing the devices for feeding, guiding and bending the foundation strips of the tube to be formed.

Fig. 6 is a detached detail view in end elevation of a foundation strip guide and bending device;

Fig. 7 is a broken detail view in longitudinal section of the same;

Fig. 8 is a broken view in longitudinal central section through the mandrel showing the manner of mounting the same, and illustrating means for supplying water for moistening the gummed surfaces of the ply strips employed in producing the tube body structure, the parts being in vertical longitudinal section on the line 8—8 of Fig. 11;

Fig. 9 is a broken detail view in section of one form of moistening device structure suitable for use in carrying out my invention;

Fig. 10 is a detached detail view of one form of guide device for directing the foundation strips from the mandrel onto the winding shaft;

Fig. 11 is a broken detail view in vertical transverse section on the line 11—11 of Fig. 8, looking in the direction of the arrows;

Fig. 12 is a similar view on the line 12—12 of Fig. 8, looking in the direction of the arrows;

Fig. 13 is a similar view on the line 13—13 of Fig. 8, looking in the direction of the arrows;

Fig. 14 is a broken detail view showing one form of support for a roll of material to form a ply of or strip for the tubular structure to be produced, and also showing the manner of mounting the same, parts being in section on the line 14—14 of Fig. 15;

Fig. 15 is a view in section on the line 15—15 of Fig. 14, looking in the direction of the arrows;

Fig. 16 is a broken detail view in section on the line 16—16 of Fig. 14, looking in the direction of the arrows;

Fig. 17 is a broken detail view in section on the line 17—17 of Fig. 14, looking in the direction of the arrows;

Fig. 18 is a broken detail view in side elevation, parts in vertical section, showing a form of tube feeding, guiding, forming and solidifying unit employed in connection with the apparatus shown in Fig. 1;

Fig. 22 is a broken detail view in longitudinal section, of a portion of the structure employed for distributing water to the moistener devices;

Fig. 23 is a broken detail view in longitudinal section on the line 23—23, Fig. 24, showing a slightly different form of moistening device embodying the principles of my invention;

Fig. 24 is a longitudinal sectional view on the line 24—24, Fig. 23, looking in the direction of the arrows;

Fig. 25 is a broken detail view in section showing a slightly different form of guide for the foundation strips;

Fig. 26 is an end view of the structure shown in Fig. 25, looking from the plane of line 26—26;

Fig. 27 is a detached detail view in end elevation of means to condense, shape and consolidate the tubular structure as it is formed on the winding machine;

Fig. 28 is a view in side elevation on an enlarged scale of the structure shown in Fig. 27;

Fig. 29 is a broken detail view in side elevation, parts broken off, showing one structure of tube capable of being produced in an apparatus and according to the process embodying the principles of my invention;

Fig. 30 is a view in transverse section on a somewhat larger scale, on the line 30—30, Fig. 29, looking in the direction of the arrows;

Fig. 31 is a broken detail view on the line 31—31, Fig. 30, looking in the direction of the arrows; and Fig. 32 is a broken and sectioned view of a six layer tube having the three outer layers wound in the opposite direction to the three inner layers.

The same part is designated by the same reference numeral wherever it occurs throughout the several views.

Figure 19:
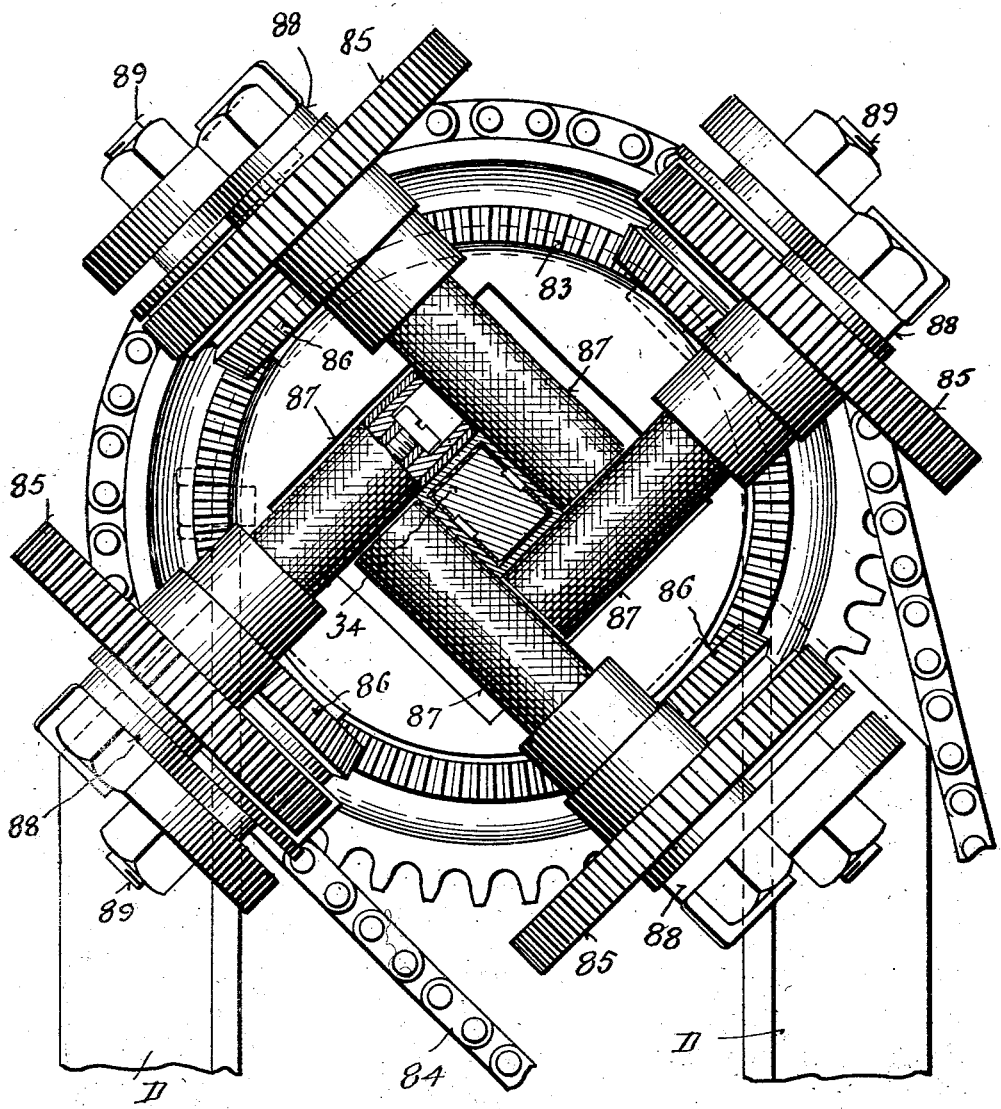
Fig. 19 is a view in transverse section of the same on the line 19—19 of Fig. 1, looking in the direction of the arrows.

In the manufacture of transformer, and other magnetic coil structures it has been found, in practice, to be desirable and economical to supply the coils for a magnetic core with a central opening or space through which the central members of the magnet core laminations may extend in assembling the completed coil. In order to secure the best results it has been found in practice to be desirable and advantageous to wind the magnet coil upon a support of rectangular, oblong or polysided shape in cross-section, in order that the successive windings of the wire may be so relatively disposed with respect to each other, and with respect to the magnet circuit afforded by the laminated core structure, as to secure the maximum effect in or from the magnetic circuit. It is also desirable and advantageous to provide a support upon which the magnet coils may be wound which affords a strong and substantial support for such coils during the winding thereof, but which, at the same time, can be produced rapidly and cheaply.

It is among the special purposes of my present invention to provide a method of operation and an apparatus suitable for use in the production of a tubular structure, expeditiously and economically, and which is suitable for use as a support upon which magnet coil windings may be wound.

In carrying out my invention I propose to supply suitable foundation strips of fibrous material, such, for instance, as paper, carried in rolls, and, in the case of the production of polysided tubes, such foundation strips are bent or folded into angular shape and are so relatively disposed with respect to each other as to be applied over the corners of a forming arbor, to constitute a preliminary supply or foundation upon which are applied, and helically wrapped, suitable strips of paper or other suitable material to constitute the body of the tube. The foundation strips referred to serve not only as foundation strips upon which the tube structure is formed, but they also serve the purpose of preventing the gummed surface of the inner body strip from adhering to or coming in contact with the exterior surface of the arbor on which the tube is formed.

The body of the tube is formed of successive layers or plies of fibrous material, preferably supplied in the form of continuous strips and helically wrapped together or upon each other, each of the strips being preferably gummed or supplied with an adhesive on one surface thereof. The rolls constituting the source of supply of the body strips are positioned in annularly displaced relation with respect to each other, and with respect to the arbor upon which the tube is to be formed. The head carrying the annularly displaced paper strip supply reels are mounted to revolve co-axially with the arbor on which the body of the tube is wound. The revolving head carries a plurality of the reels. In Figs. 1, 2, 3 and 4, a rotating head structure is shown upon which are mounted six strip supply reels, these being annularly displaced relatively to each other and to their supporting carrier head, said head revolving in a direction to permit the winding of the various strips of paper in overlapping and helical relation with respect to each other.

Figure 20:
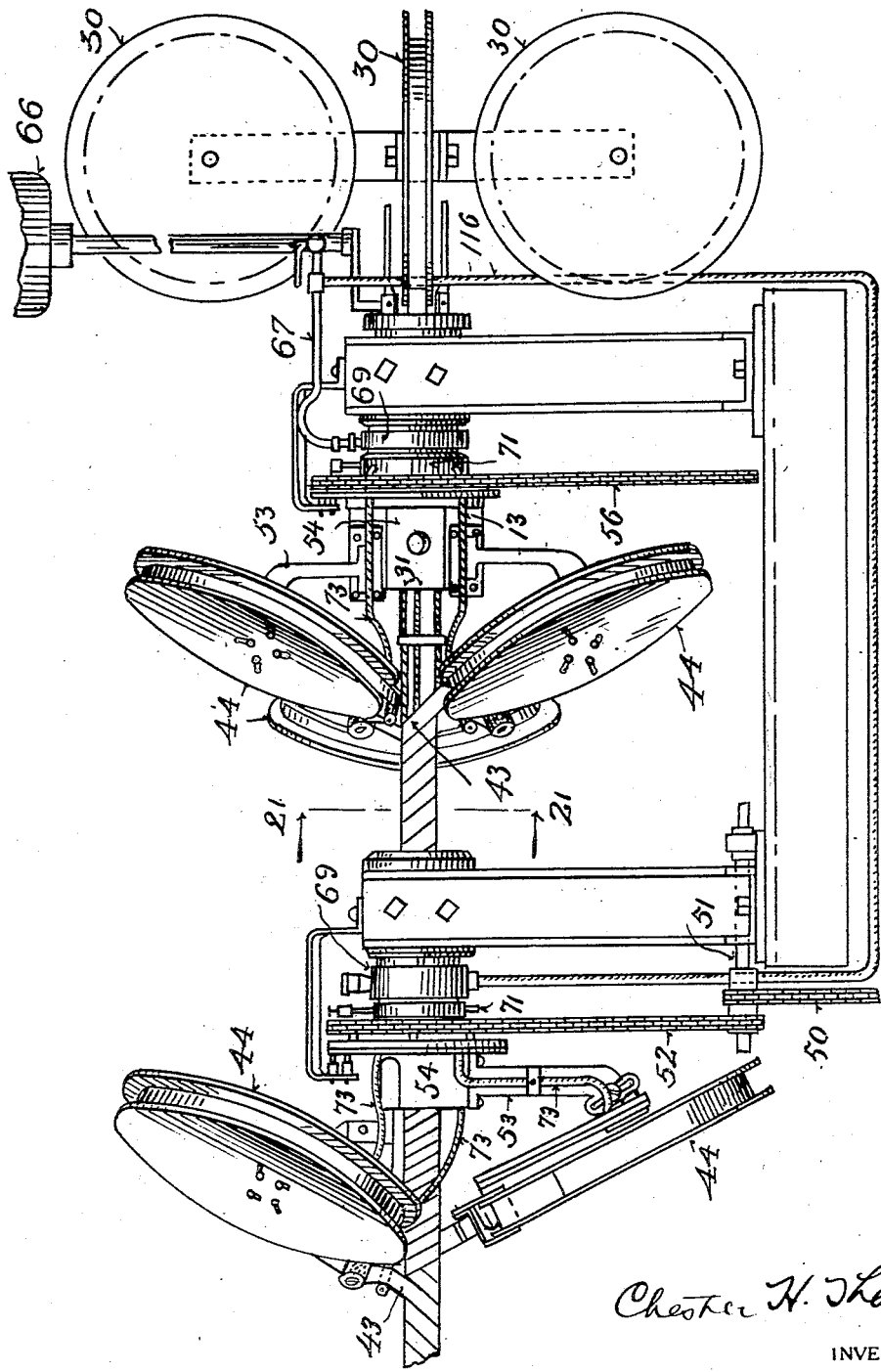
Fig. 20 is a view in side elevation of the right-hand end of the machine showing an arrangement of strip feeding heads and reels disposed to operate in sets or groups and in respectively opposite directions of rotation, and embodying the principles of my invention.
Figure 21:
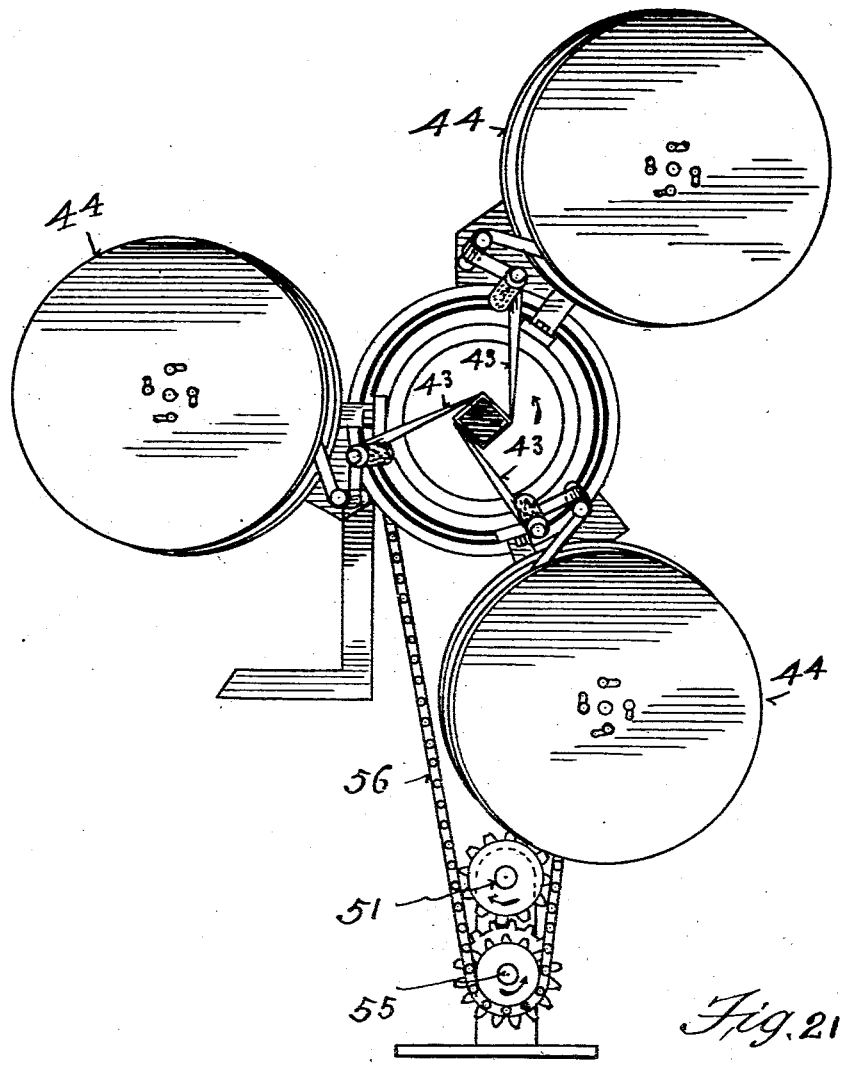
Fig. 21 is a view in transverse section on the line 21—21 of Fig. 20, looking in the direction of the arrows.

In Figs. 20 and 21, I have shown an arrangement embodying my invention in which the paper strip supply reels are formed into groups of three each, one group being mounted to revolve in one direction and the other group being mounted to revolve in the opposite direction.

As the strips of material are supplied from their supply reels for winding or lapping upon each other upon the arbor, provision is made, according to the principles of my invention, to moisten or dampen the gummed surface of each strip at a point intermediate the supply reel and the point of application of the strip. As the tube is formed it is advanced continuously in longitudinal direction. This advancing action is accomplished by suitable feeding mechanism designed to engage the exterior surface of the advancing portion of the finished tubular structure and draw the tube through the machine from the point of its formation and deliver the same from the machine. In the case of the formation of a polysided tube, feeding rolls are employed which, see Fig. 19, are placed in such relation to each other as to form an opening between them through which the tube passes, each drawing or feeding roller, in the case of a polysided tube, engaging one of the straight sides of the tube. The feed rolls serve not only for feeding the finished tube continuously through and from the machine but also to more or less solidify, condense and smooth the exterior surface of the body of the tube.

If desired, and in accordance with the principles of my invention, in addition to the power driven feed rolls, suitable conveniently arranged, smoothing, condensing and solidifying devices may also be employed and made adjustable to accommodate tubes of various sizes, as shown in Figs. 27 and 28.

The proper guiding of the foundation strips from their reels, and the bending of the same, in case polysided tubes are to be produced, the moistening of the gummed surfaces of the strips, the adjustability of the apparatus to produce tubes of varying sizes and the adjustments of the smoothing, condensing or ironing devices which act to solidify the bodies of the tubes, are all features of importance.

While tubes made in accordance with my invention are produced in a continuous operation, in practice I prefer to provide means for cutting off from the forming tube, successive lengths thereof, the severed lengths being utilized in winding simultaneously thereon a plurality of magnet coils at spaced distances apart. In practice a length of tube section sufficient to enable me to wind thereon from five to as high as twenty magnet coils simultaneously enables me to vastly increase the production of transformer magnet coils. Subsequently the tubular sections upon which such coils are wound are transversely severed between adjacent coil windings, thereby producing the individual magnet coils.

The body of the tubular product produced with the apparatus and according to the method and mode of operation of my invention, is made up of successively applied helically wrapped layers of paper or other material. All of the successive windings may be helically wound in the same direction, if desired, or, some may be wound in one direction and others in the opposite direction. Where the strips employed are gummed on one surface thereof, by slightly moistening the gummed surface, a very excellent adhering action is secured of the overlapping windings or plies. By the action of the ironing and feeding devices the body or walls of the tube are solidified, condensed and ironed out thereby producing an exceedingly strong, smooth and uniform coil supporting structure.

Having now pointed out in general terms various features of my invention I will describe specific structures and embodiments of apparatus and steps of operation suitable for use in carrying out my invention.

Referring to Figs. 1, 2 and 3, I have shown a suitable supporting framework A upon the top of which are mounted supporting standards B, C, D, constituting a framework upon which the various working and other parts of the apparatus are mounted. At the rear or feeding-in end of the machine are carried a plurality of reels 30' upon each of which is mounted a roll of suitable material such, for instance, as paper. In the arrangement shown four reels 30 are employed. These reels are disposed in annularly displaced relation with respect to each other at 90° apart. Such arrangement brings two of the reels into, say, the same horizontal plane and the other two into the same vertical plane, this being the arrangement shown. Of course, the invention is not to be limited or confined to this particular arrangement of the reels referred to. From each reel a strip of paper or other suitable material, indicated at 31, is drawn, each strip being guided into a line which extends longitudinally of the machine in substantially parallel relation to each of the others, but displaced annularly apart from each other corresponding to the annular displacement of the reels from which said respective strips are drawn. For guiding the various strips 31, I have shown suitable guide pins 32, see Fig. 5, around which the strips 31 pass when drawn from the respective reels. The strips 31 constitute what I will designate as foundation strips for the tube to be produced. After passing the guides 32 the strips 31 extend along a mandrel device 33. This mandrel is in the form of a tube which is seated at one end endwise against the end of an arbor 34, see Fig. 8, the mandrel 33 being supported and tightly clamped against the end of the arbor 34 by means of a clamp rod 35. The strips 31 extend lengthwise of the mandrel 33, within an enclosing cylinder 36, through which the mandrel 33 extends. Where the tube to be produced is intended to be of the polysided type, that is, of rectangular or oblong section, the mandrel 33, as well as the arbor 34, will be of corresponding sectional contour. In this case it is desirable that the strips 31 be bent or folded into angular shape so as to fit over the corners of the mandrel 33, as very clearly indicated in Figs. 5 and 8. To effect this result each strip 31, after passing its guide 32, is threaded through a clip or guide device 37. This guide device, see Figs. 6 and 7, is channel shaped in its transverse dimension, and is suitably curved or bent laterally at its longitudinal edges so as to cause a strip drawn therethrough to be bent or shaped into angle cross-section for application over the corners of the rectangular shaped mandrel 33, as clearly indicated in Fig. 5. It will be understood that where a cylindrical tube is to be formed a cylindrical arbor will be employed. Also, that different diameters of arbors will be used according to the size of tube to be produced. After passing beyond the forward end of the mandrel 33, the foundation strips 31 are brought into contact with the arbor 34. To effect this result and in a manner that will avoid danger of injury to the strip 31, I propose to guide each strip 31 from the forward end of the mandrel 33 onto the surface of the arbor 34. One arrangement of guide for this purpose is illustrated in Fig. 8, wherein a block 38 is carried by a yielding support, such, for example, as a suitably mounted spring 39. Where a tube is to be produced of rectangular cross-section the guide 38 is formed with an angle-shaped guiding notch indicated at 40, see Fig. 10, with retaining lips 41. Each strip is threaded through this guide notch 40 and is retained in its angular form therein by the lips 41.

In Figs. 25 and 26, I have shown a somewhat simpler structure of guide wherein guide clips 42 are adjustably mounted on the arbor 34, sufficient space being provided between the inner surfaces of the clips and the exterior surfaces of the arbor 34, to receive and permit the passage therebetween of the right-angularly shaped foundation strips 31. Other structures of guides might readily suggest themselves to persons skilled in the art and still fall within the spirit and scope of my invention.

Thus the foundation strips 31 are drawn from their paper rolls, and are bent into angular shape, where a square or rectangularly shaped tube is to be produced, and are drawn longitudinally onto and applied over the corners of the rectangular arbor 34.

The next feature of my invention is the winding onto the arbor 34, or rather over and upon the foundation strips carried by the arbor, of strips of paper or other suitable material in a succession of laps or plies. Various arrangements may be provided for effecting the spiral wrapping of the body strips in forming the body of the tube to be produced, and I have shown various arrangements for accomplishing this purpose.

In Figs. 1, 2, 3 and 4, I have shown one arrangement wherein the body strips 43 are drawn from rolls carried by reels 44. In this case six reels 44 are shown. Each reel is supported by an arm 45 and in such position as to permit a slant or inclination of the reels with relation to the axis of the arbor 34, whereby each body strip 43 extends in a straight line from its roll to the point of the application thereof on the arbor, as most clearly shown in Fig. 3.

Where six of the reels 44 are employed in the same group the spiral wrapping operation is accomplished by rotative movement of the head which carries the reels in a constant direction. In other words, the head which carries all of the body strip supply rolls revolves in one direction only. To secure the proper overlapping relation of the successive layers of strips while being wound into the tube body, the supports for the respective reels 44 are slightly spaced apart from each other longitudinally of the arbor 34. And in order to adapt the apparatus for different sizes of tubes the reel supporting arms 45 are adjustably mounted on the revolving head 46. This is accomplishd by means of clamp bolts 47, see Fig. 8, by means of which the reel supporting arms 45 are secured to the head 46. These clamp bolts extend through elongated slots 48, thus permitting adjustment of the arms 45 in the direction of the length of the arbor 34. Also, as above stated, the arms 45 are spaced apart axially, that is, in the direction of the length of the arbor 34. By reason of this stepped mounting of the reels the lines of supply of the various strips 43 to the arbor are properly disposed and in proper relation to enable the strips to be helically lapped upon each other.

Rotation is imparted to the heads 46 upon which the supply reels 44 are mounted. This may be accomplished by any suitable or convenient arrangement of drive mechanism. A simple arrangement is shown wherein a motor 49 is mounted in the framework A from which, through suitable gearing 50, a shaft 51 is driven. Through suitable gearing 52, driven from shaft 51, the head 46 is driven.

In Figs. 20 and 21, I have shown a slightly different arrangement wherein, in place of arranging all of the reels 44 in one single group, revolved in one direction of rotation, I have divided the reels up into two groups of three reels each, and I have provided means whereby one group is revolved or driven in one direction, that is, the supporting head for one group is so driven, and the head which carries the other group is driven in the opposite direction. In this instance, the supporting arms 53 of each group of reels are mounted upon a rotating head 54, one head 54 being rotated in one direction and the other rotated in the opposite direction, but at equal speed and at the same time. Any suitable arrangement of gearing may be employed for this purpose. I have shown a simple arrangement, see Figs. 20 and 21, wherein a counter shaft 55 is geared to and driven from the motor driven shaft 51, thereby reversing the direction of rotation of shaft 55 with relation to shaft 51. One of the heads 54 is driven through gearing to shaft 51, as above described, through gear connections 52, while the other head is driven through gear connections 56, see Fig. 21, from shaft 55. In this way one group of reels is revolved or driven in one direction and the other is revolved or driven in the opposite direction.

The body strips 43 of each group are helically wrapped or wound in lapped relation with respect to each other, and in the same direction of lay, the wrappings of the one group being applied in the opposite direction to that of the strips of the other group. This produces an exceptionally strong and rigid structure of tube which, at the same time, is very light in weight and is admirably adapted for use as a support upon which transformer or other coils may be wound, in the manufacture of electro-magnets, transformers, impedances and various other electrical appliances.

In order that the successive layers or plies of material may be intimately united when helically wound upon and lapped over each other, it is sometimes desirable to employ body strips having one of the faces or surfaces thereof suitably gummed. In such case it is desirable to moisten the gummed surface of each gummed strip before it is wrapped into the body structure of the tube. Various means may be employed for supplying the moistening water. One simple arrangement is shown in Figs. 8, 9, 14 and 15 wherein each reel support has mounted thereon a moistening device 57, shown in this instance as a roll of suitable absorbent material. Each strip 43 as it comes from its roll passes over or around the associated moistening device 57 with its gummed surface in contact with the surface of the moistening device. If desired the strip 43 is given a suitable lead so as to pass around its associated moistening device. This is accomplished by providing a guide pin 58 around which the strip 43 passes as it is drawn from its roll and by which the strip is given a proper lead to and around the moistening device for its gummed surface to pass in contact with the moistening device 57.

A slightly different arrangement is shown in Figs. 23 and 24 wherein, in place of a roller type of moistening device I have shown a brush type, the bristles 59 of the brush being secured at their inner ends within a tubular holder member 60 which is enclosed within an outer tube 61, the latter being provided at one end with a nipple 62 for application of a connection 73 to a convenient source of water supply. The opposite end of the tube 61 has threaded into it a stop plug 64. The bristles 59 of the brush extend through a slot 65 in the outer tube 61. In other words, the inner tube 60 constitutes a holder for the bristles but being tubular a water supply through the nipple end of the outer tube 61 permits an efficient distribution of the water to the bristles which extend through the slot 65 and into position for the gummed surface of the strip 43 to brush thereover.

It is obvious that other forms of moistening devices may be employed without depature from the spirit and scope of my invention.

The moistening water may be supplied to the moistening device in various ways. A simple arrangement is shown wherein a storage tank 66 for the moistening water is suitably supported upon a convenient part of the framework. From the storage tank 66 a pipe 67 delivers into an annular channel 68, see Figs. 8 and 12, in a coupling ring member 69 which is stationary with reference to the revolving head 46. The annular channel 68 communicates with an annular channel 70 in a cooperating ring member 71, against the outer face of which ring member 69 bears, an efficient bearing contact being maintained between the ring members 69, 71 by means of coiled springs 72 interposed between the ring member 69 and the hub of the supporting arm B. The ring member 71 is mounted to rotate with the head 46. Communicating with the annular channel 70, see Fig. 13, at points annularly spaced apart from each other, are a series of pipe connections 73 which deliver, respectively, to the moistening devices 57, 59, of the reel supports 45, through the pipe connections 73.

In Figs. 20 and 22, I have shown a slightly different arrangement of water distribution to the moistening devices which permits a more accurate and desirable control of such distribution than is permitted by the structure and arrangement above described. In the arrangement shown in Fig. 22, the registering annular channels 68, 70 are formed in the respective surfaces of rings 69, 71, which fit against each other the water supply pipe 67 from the tank 66, delivering into the channel 68, of ring 69. Ducts 112 are bored through the body of ring 71, which communicate with the channel 70 at annularly spaced apart points, and with each duct 112 communicates a radial bore 113 with which is associated a fitting 114. To this fitting is connected a pipe 73 leading to an associated moistening device. Also mounted in each fitting 114 is a screw valve 115, by means of which the flow of water to the associated moistening device may be regulated and controlled. In this manner an efficient control and regulation may be effected of the water distribution to the moistening devices. This constitutes an important practical feature of my invention which contributes to the advantageous and successful operation of the apparatus.

As shown in Fig. 22 the ring members 69, 71, are in slightly separated apart position. This is merely for the purpose of clearness of illustration. In use, of course, the surfaces of these members in which the channels 68, 70 are formed are in close bearing contact with each other.

Where the spaced apart arrangement of the groups of strip reels is employed, as shown in Fig. 20, the same tank 66 supplies water to the moistening devices of both groups, one group being supplied with water from the tank through pipe connection 67, and the other through a branch connection 116, each group being equipped with its own set of ring members 69, 71, and distributing connections 73.

The roll of paper from which the body strips 43 are drawn may be supported upon any suitable or convenient reel structure and mounting therefor. I have shown a simple reel structure and mounting, see particularly Figs. 14, 15, 16 and 17, which I have found suitable and satisfactory, but to which my invention is not to be limited or restricted. In the structure shown I mount a hub 74 upon a pintle pin 75 carried in a standard 76. Upon the hub 74 the reel 44 is slipped. To facilitate the application, or removal, of the reel 44, a face plate 77 is applied and clamped to one face of the hub 74, said plate being detachably held in applied position by means of a clamp nut 78, see Fig. 16. The reel 44 is loosely held on the hub 74, but, if desired, said reel may be restrained from too free rotative movement on the hub in any suitable or convenient manner. A simple arrangement is shown wherein a coil spring 79 is interposed between the plate 77 and the side surface of the reel 44. This spring serves to impose a tension upon the reel tending to resist to some extent its free rotative movement. The tension of the spring 79 may be regulated in any suitable or convenient manner.

Any suitable arrangement may be provided for adjustably tilting the reel 44 about the axis of the pintle 75. A simple arrangement is shown wherein the pintle 75 is provided at one end with a slotted arm 80. By means of a clamp nut 81 operating through a slot 82 in said arm and into a threaded opening in the standard 76 the reel support and reel may be conveniently clamped and secured in any desired position of inclination, as will be readily understood by reference to Fig. 14.

After the tube body has been formed in the manner above described, and in order to secure a continuous operation, it is necessary for the completed portion of the tube to be fed or drawn on through the machine as it is completed. Also, it is important and advantageous to subject the formed tube to a solidifying, condensing and shaping action, to the end that uniformity of dimension and shape and density of the tube may be attained and the tubular structure thereof strengthened.

In Figs. 1, 18 and 19, I have shown one form of feeding mechanism suitable for this purpose, and which, in this instance, consists of a bevel gear 83 driven through suitable gear connections 84 from the motor driven shaft 51. Meshing with the beveled gear 83 are a series of driven bevel gears 86, shown in this instance as four in number, spaced equal distances apart annularly, and each geared through gearing 85 with a stub shaft upon the end of which is mounted a feed roll 87. Each roll 87 is arranged to engage a surface, or side surface, of the completed tube, as clearly shown in Fig. 19. In this manner the tube is engaged at points 90° apart from each other, that is, at four equally spaced apart annular points, by gripping feed rolls which are power driven and by means of which the tube as it is formed is progressed and drawn forward through and delivered from the machine. The same action serves also to exert a condensing pressure on the tube body wall by pressing the same against the arbor 34, thereby not only shaping but also condensing and solidifying to uniform condition the walls of the tube throughout its continuous length. It will be observed that in the case of a rectangularly shaped tube the members of one pair of feed rolls 87, are respectively disposed on opposite sides or surfaces of the tube and arbor, and the members of the other pair of rolls are respectively disposed at opposite sides of the intermediate surfaces of the tube, thus producing an opening between the assembled feed rolls which is rectangular in contour and of dimensions to receive the rectangularly shaped tube therethrough, the tube being gripped on all four sides or surfaces thereof and pressed against the arbor and fed or drawn along the arbor. The presence within the finished portion of the tube of the foundation strips 31 serve to facilitate the stripping of the tube from the arbor under the feeding action of the feed rolls 87. It will be observed that the feed rolls 87 are carried in links 88 which are pivoted upon the studs 89 which carry the bevel gears 86. This insures an efficient gripping action of each roll upon the surface of the tube. It also affords opportunity for slight yielding of the feed rolls 87 due to any unusual obstruction or unevenness in the tube surface. If desired, and in order to impose and maintain a desirable gripping tension upon the feed rolls, bent springs 90, or other suitable means, may be arranged to act upon the feed rolls 87, or the stub shafts which carry them, tending to yieldingly press said rolls towards and into gripping contact with the tubes, see Fig. 18.

In Figs. 27 and 28, I have shown a structure of ironing unit through which the tube may be passed or drawn as it is formed and is being delivered from the machine, provisions being made therein for adjustment to accommodate tubes of various sizes, and which unit may be employed in addition to, or independently of, the tube feeding devices above referred to. The structure shown embodying this feature of my invention is as follows:

Suitably supported presser rolls arranged in groups are so disposed with relation to each other, and with relation to the path of travel of the completed portion of the tube as the latter is drawn through and delivered from the machine, so as to make bearing contact at a plurality of points spaced apart from each other at each side or face of the tube. For example, referring to Fig. 28 one group of presser rolls 91 are disposed at one side of the path of travel of the completed tube, and a cooperating group of presser rolls 91 are disposed to extend transversely across the path of travel of the tube at the opposite side thereof. Likewise groups of presser rolls 92 (see Fig. 27) are respectively disposed opposite the other two sides or surfaces of the tube. Each of the presser rolls 91, 92, is carried by end pintle 105 at the ends thereof which are mounted in bars 96, 98. The bars 96, 98 of the two respective pairs of sets of rolls 91, 92 are disposed in parallel relation with respect to each other. A stud 99, 100, carried by the ends of the bars 96, 98, respectively, work in elongated slots 101 in a supporting framework 102, see Fig. 27. This affords means which are simple whereby the rolls of each pair of groups may be simultaneously adjusted as groups towards or away from each other to accommodate tubes of varying sizes. To effect the desired adjustment of the supporting bars 96, 98, a pair of adjusting screws 103, work through studs or projections 104, 105, on the roll supporting bars 96, 98, respectively. There is an adjusting screw 103 for each of the supporting bars 96, 98. It will be observed that the ironing unit structure forms in effect a rectangular opening or space 94, see Fig. 27, through which the tube is progressed.

In order that the rolls 91, 92 may be yieldingly pressed into compacting relation with respect to the tube passing through the ironing unit, springs 107, see Fig. 28, are arranged to impose a yielding tension upon the various rolls tending to press them into bearing contact upon the surface of the tube passing between said rolls. The function of this ironing and smoothing unit is to aid in uniformly condensing and compacting the body walls of the tube, and in solidifying the same, while, at the same time, giving a final set to the shape or exterior contour of the tube and smoothing out or ironing any irregularities in the surfaces of the tube.

If desired, the tube as delivered from the machine may be severed into any desired lengths. Any cut-off or severing mechanism for accomplishing this purpose may be employed. A simple arrangement is shown wherein a cut-off saw 108, see Fig. 1, is mounted in a swinging frame indicated at 109 and is driven by suitable gear connections 110 from the motor driven shaft 51. Under suitable control the cut-off device 108 may be rocked or swung periodically or otherwise, so as to cut the tube into successive sections of uniform lengths as it comes from the machine.

While I have described the tube produced on the machine and in accordance with the process of my invention as being specially adapted for use as a support for the coils of electromagnets, it is to be understood that my invention is not to be limited or restricted with reference to the utilization of the tubular product as it is quite obvious that, inasmuch as a strong, rigid and efficient tubular structure is produced, it may be utilized for any purposes for which it is adapted such, for example, as by being cut up into suitable lengths and employed for containers for various products.

In Figs. 29, 30, 31 and 32, I have shown the completed tube structure, and have indicated how the same is produced. The foundation strips 31, while shown in Figs. 29 and 30, are not intended to form a permanent part of the tube, but are intended to serve only as foundation strips upon which the tube is wound, and to facilitate the stripping of the completed tube from the arbor on which the strips composing the tube are wound. In the case of the structure shown in Figs. 1, 2, 3 and 4, six individual strips are helically coiled together in successively overlapping relation to each other. This makes a tube having a wall thickness consisting of six layers of superposed material. As shown in Fig. 29 all of the six strips constituting the layers are helically applied or wound in the same direction. While this is a satisfactory and efficient method of winding the strips, nevertheless, a somewhat better braced and strengthened tubular structure is produced, and a somewhat simpler structure of mechanism is required, where three of the strips are wound or lapped successively one upon the other in one direction and the other three are lapped upon each other in the opposite direction as indicated in Figs. 20 and 32. In either case, of course, there will be as many thicknesses or plies in the body of the tube wall as there are strips of material to be wound together. It is to be understood that my invention is not to be limited or restricted to a six ply tube structure, as a greater or a less number of strips may be used. Nor is it to be understood that my invention is confined to the production of a tube which is rectangular in cross-section as tubes of other sectional contours may be equally well produced in accordance with the spirit and principle of my invention.

It will be readily understood that tubes of various sizes may be produced in accordance with my invention by using an arbor of the desired size.

It is obvious that instead of using previously gummed strips, a suitable liquid or other form of adhesive may be applied to the individual strips while being drawn from their reels.

What I claim as new and useful, and of my own invention, and desire to secure by Letters Patent, is,—

1. The method of making tubular structures which consists in feeding a plurality of foundation strips longitudinally and in separated parallel relation to each other, and helically wrapping a plurality of body strips in overlapping relation to each other upon the foundation strips, and progressing the tube thus formed, and severing the formed tube into lengths for use.

2. The method of making tubular structures which consists in feeding a plurality of foundation strips longitudinally and in separated parallel relation to each other, and helically wrapping a plurality of body strips in overlapping relation to each other upon the foundation strips, and progressing the tube thus formed, some of said body strips being helically wound in one direction and others helically wound in the opposite direction, and severing the formed tube into lengths for use.

3. The method of making tubular structures which consists in feeding a plurality of foundation strips longitudinally and in spaced parallel relation to each other, and helically wrapping a plurality of body strips in overlapping relation to each other upon the foundation strips, and progressing the tube thus formed, subjecting the wall of the tubular structure to an ironing compression to condense and solidify the same, and severing the formed tube into lengths for use.

4. In an apparatus for making tubular structures, a plurality of rotatable heads, longitudinally displaced with respect to each other, an arbor around which said heads revolve, feeding mechanism for supplying a plurality of foundation strips along said arbor in spaced relation, a plurality of reels carried by each head, means to guide a strip of material from each reel to said arbor to be helically wound thereon, all of the strips being applied at longitudinally spaced points, and means to rotate said heads in opposite directions.

5. In an apparatus for making tubular structures, a plurality of rotatable heads, longitudinally displaced with respect to each other, an arbor around which said heads revolve, means to feed a plurality of foundation strips along said arbor in spaced relation, a plurality of reels carried by each head, means to guide a strip of material from each reel to said arbor to be helically wound thereon in overlying relation to the foundation strips, and means to rotate said heads in opposite directions, the reels on each head being mounted in longitudinally displaced relation to each other.

6. In an apparatus for making tubular structures, a plurality of rotatable heads, longitudinally displaced with respect to each other, an arbor around which said heads revolve, a plurality of reels carried by each head, means to guide a strip of material from each reel to said arbor to be helically wound thereon, means to draw the tube, as it is formed, through said heads, and means to rotate said heads in opposite directions, said drawing means operating to exert a compressing action upon the body wall of the tube to solidify and condense the same.

7. In an apparatus for making tubes, an arbor, means to supply foundation strips longitudinally along said arbor and in parallel separated relation to each other, a head mounted to revolve about said arbor, a plurality of reels carried by said head, means to guide a strip of material from each reel to said arbor to be wound helically about said arbor and foundation strips, and means to rotate said head.

8. In an apparatus for making tubes, an arbor, means to supply foundation strips longitudinally along said arbor and in spaced parallel relation to each other, a head mounted to revolve about said arbor, a plurality of reels carried by said head, means to guide a strip of material from each reel to said arbor to be wound helically about said arbor and foundation strips, means to engage the tube as it is formed to draw the same along said arbor, and means to rotate said head, said reels being mounted on said head in annular relation with respect to the arbor and delivering the strips to the arbor at longitudinally displaced points.

9. In an apparatus for making tubes, an arbor, means to supply foundation strips longitudinally along said arbor and in separated parallel relation to each other, a plurality of heads each mounted to revolve around said arbor, and in longitudinally displaced relation with respect to each other, a plurality of reels carried by each head, means to guide a strip of material from each reel to the arbor to be helically wound thereon and upon said foundation strips, and means to rotate said heads.

10. In an apparatus for making tubes, an arbor, means to supply foundation strips longitudinally along said arbor and in spaced parallel relation to each other, a plurality of heads each mounted to revolve around said arbor, and in longitudinally displaced relation with respect to each other, a plurality of reels carried by each head, means to guide a strip of material from each reel to the arbor to be helically wound thereon and upon said foundation strips, and means to rotate said heads in opposite directions.

11. In an apparatus for making tubes, an arbor, means to supply foundation strips longitudinally along said arbor and in parallel relation to each other, a plurality of heads each mounted to revolve around said arbor, and in longitudinally displaced relation with respect to each other, a plurality of reels carried by each head, means to guide a strip of material from each reel to the arbor to be helically wound thereon and upon said foundation strips, and means to rotate said heads, said reels on each head being mounted in annularly and longitudinally displaced relation with respect to each other.

12. In an apparatus for making tubes, an arbor, means to supply foundation strips longitudinally along said arbor and in parallel relation to each other, a plurality of heads each mounted to revolve around said arbor, and in longitudinally displaced relation with respect to each other, a plurality of reels carried by each head, means to guide a strip of material from each reel to the arbor to be helically wound thereon and upon said foundation strips, means to draw the tube as it is formed, through said heads and along said arbor, and means to rotate said heads in opposite directions.

13. In an apparatus for making tubes, an arbor, means to supply foundation strips longitudinally along said arbor and in parallel relation to each other, a plurality of heads each mounted to revolve around said arbor, and in longitudinally displaced relation with respect to each other, a plurality of reels carried by each head, means to guide a strip of material from each reel to the arbor to be helically wound thereon and upon said foundation strips, means to draw the tube as it is formed, through said heads and along said arbor, and means to rotate said heads in opposite directions, said drawing means operating to exert a compressing action upon the wall of the tube to condense and solidify the same.

14. In an apparatus for making polysided tubes, an arbor, a plurality of foundation strip supply reels annularly spaced about the line of axis of said arbor, means to guide the strips from said reels to and along said arbor in spaced relation, said means operating to bend each strip into angular shape in transverse section, a head mounted to revolve about the axis of said arbor, a plurality of body strip reels carried by said head, means to guide each body strip to said arbor to be helically wound thereon and about said foundation strips, and means to rotate said head.

15. In an apparatus for making polysided tubes, an arbor, a plurality of foundation strip supply reels annularly spaced about the line of axis of said arbor, means to guide the strips from said reels to and along said arbor, said means operating to bend each strip into angular shape in transverse section, a head mounted to revolve about the axis of said arbor, a plurality of body strip reels carried by said head, means to guide each body strip to said arbor to be helically wound thereon and about said foundation strips, and means to rotate said head, said body strip reels being mounted in annularly and longitudinally displaced relation with respect to each other.

16. In an apparatus for making polysided tubes, an arbor, a plurality of foundation strip supply reels annularly spaced about the line of axis of said arbor, means to guide the strips from said reels to and along said arbor, said means operating to bend each strip into angular shape in transverse section, a head mounted to revolve about the axis of said arbor, a plurality of body strip reels carried by said head, means to guide each body strip to said arbor to be helically wound thereon and about said foundation strips, means to draw the tube as it is formed through said head and along said arbor, and means to rotate said head.

17. In an apparatus for making polysided tubes, an arbor, a plurality of foundation strip supply reels annularly spaced about the line of axis of said arbor, means to guide the strips from said reels to and along said arbor, said means operating to bend each strip into angular shape in transverse section, a head mounted to revolve about the axis of said arbor, a plurality of body strip reels carried by said head, means to guide each body strip to said arbor to be helically wound thereon and about said foundation strips, means to draw the tube as it is formed through said head and along said arbor, and means to rotate said head, said drawing means operating to exert a compressing action upon the walls of the tube body to solidify and condense the same.

18. In an apparatus for making polysided tubes, a polysided arbor, means to supply foundation strips along said arbor and in parallel relation to each other, said strips being bent into angular form in cross-section to fit over the corners of said arbor, and means to helically wind tube body strips upon and around said arbor and foundation strips.

19. In an apparatus for making polysided tubes, a polysided arbor, means to supply foundation strips along said arbor and in parallel relation to each other, said strips being bent into angular form in cross-section to fit over the corners of said arbor, means to helically wind tube body strips upon and around said arbor and foundation strips, and means to draw the tube, as it is formed along said arbor.

20. In an apparatus for making polysided tubes, a polysided arbor, means to supply foundation strips along said arbor and in parallel relation to each other, said strips being bent into angular form in cross-section to fit over the corners of said arbor, means to helically wind tube body strips upon and around said arbor and foundation strips, and means to draw the tube, as it is formed along said arbor, said drawing means operating to exert a compressing action upon the walls of the tube to condense and solidify the same.

21. In an apparatus for making polysided tubes, a polysided arbor, means to supply foundation strips along said arbor and in parallel relation to each other, said strips being bent into angular form in cross-section to fit over the corners of said arbor, and means to helically wind tube body strips upon and around said arbor and foundation strips, some of the body strips being wound in one direction and others in the opposite direction.

22. In a machine for making tubes, an arbor, body strip supplying and winding devices, including strip supply reels and supports therefor and means to guide the strips therefrom and wind the same upon said arbor, in combination with means to moisten the strips before being wound on the mandrel, and means to adjustably supply the water to the moistening means.

23. In a machine for making tubes, an arbor, body strip supplying and winding devices, including strip supply reels and supports therefor and means to guide the strips therefrom and wind the same upon said arbor, in combination with strip moistening devices carried by the strip supply reel supports, and over which the strip passes to the arbor, and means to supply water to the moistening devices.

24. In a machine for making tubes, an arbor, body strip supplying and winding devices, including strip supply reels and supports therefor and means to guide the strips therefrom and wind the same upon said arbor, in combination with strip moistening devices carried by the strip supply reel supports, and over which the strip passes to the arbor, and means to supply water to the moistening devices, including relatively rotating ring members having communicating channels, a water supply delivering to one of said channels, and distributing connections delivering from the other of said channels to said moistening devices.

25. In a machine for making tubes, an arbor, body strip supplying and winding devices, including strip supply reels and supports therefor and means to guide the strips therefrom and wind the same upon said arbor, in combination with strip moistening devices carried by the strip supply reel supports, and over which the strip passes to the arbor, means to supply water to the moistening devices, including relatively rotating ring members having communicating channels, a water supply delivering to one of said channels, distributing connections delivering from the other of said chanenls to said moistening devices, and means to adjustably control the supply of water through said distributing connections.

26. In a machine for making tubes, an arbor, a mandrel aligned with said arbor, a rotary head surrounding said mandrel, supports carried by said head, body strip supply reels carried by said supports, and means to guide the body strips from said reels to said arbor for winding thereon.

27. In a machine for making tubes, an arbor, a mandrel aligned with said arbor, a rotary head surrounding said mandrel, supports carried by said head, body strip supply reels carried by said supports, and means to guide the body strips from said reels to said arbor for winding thereon, said mandrel being detachably connected to said arbor.

28. In a machine for making tubes, an arbor, a mandrel aligned with said arbor, a rotary head surrounding said mandrel, supports carried by said head, body strip supply reels carried by said supports, means to guide the body strips from said reels to said arbor for winding thereon, in combination with foundation strip supporting reels, and means to guide foundation strips from said last mentioned reels along said mandrel and to the arbor to be enclosed by the windings of said body strips.

29. In a machine for making tubes, an arbor, a mandrel aligned with said arbor, a rotary head surrounding said mandrel, supports carried by said head, body strip supply reels carried by said supports, means to guide the body strips from said reels to said arbor for winding thereon, and means to independently adjust said supports in a direction lengthwise of said arbor.

30. In a machine for making tubes, an arbor, a rotary head, supports carried by said head, body strip supporting reels mounted on said supports, means to guide body strips from said reels for winding upon said arbor, and means to draw the tube along said arbor for delivery therefrom, in combination with a compressing device through which the formed tube passes, said device including loosely mounted adjustable rolls arranged to engage and compress the entire body wall of the tube.

31. In a machine for making tubes, an arbor, a rotary head, supports carried by said head, body strip supporting reels mounted on said supports, means to guide body strips from said reels for winding upon said arbor, and means to draw the tube along said arbor for delivery therefrom, in combination with a compressing device through which the formed tube passes, said device including adjustable rolls arranged in pairs of sets disposed at respectively opposite sides of the path of travel of the tube to engage and compress the entire body wall of the tube.

32. The method of making polysided reinforced tubular structures which consists in feeding a plurality of foundation strips longitudinally and in parallel relation, forming each strip into angular cross section, supporting said strips so as to form a foundation structure, wrapping a plurality of body strips over the foundation structure in overlapping relation and progressing the tube thus formed.

CHESTER H. THORDARSON.